US011405728B2

(12) United States Patent
Leem

(10) Patent No.: US 11,405,728 B2
(45) Date of Patent: Aug. 2, 2022

(54) RECTANGULAR FLAT-TYPE SLIM SPEAKER HAVING SLIM MAGNETIC CORE

(71) Applicant: Sung Jin Leem, Yangcheon-gu Seoul (KR)

(72) Inventor: Sung Jin Leem, Yangcheon-gu Seoul (KR)

( * ) Notice: Subject to any disclaimer, the term of this patent is extended or adjusted under 35 U.S.C. 154(b) by 0 days.

(21) Appl. No.: 17/266,223

(22) PCT Filed: Aug. 7, 2019

(86) PCT No.: PCT/KR2019/009915
§ 371 (c)(1),
(2) Date: Feb. 5, 2021

(87) PCT Pub. No.: WO2020/032593
PCT Pub. Date: Mar. 13, 2020

(65) Prior Publication Data

US 2021/0297783 A1 Sep. 23, 2021

(30) Foreign Application Priority Data

Aug. 7, 2018 (KR) ........................ 10-2018-0091820

(51) Int. Cl.
*H04B 15/00* (2006.01)
*H04R 9/02* (2006.01)
*H04R 1/06* (2006.01)
*H04R 1/02* (2006.01)

(52) U.S. Cl.
CPC ............... *H04R 9/025* (2013.01); *H04R 1/06* (2013.01)

(58) Field of Classification Search
CPC .................................. H04R 9/025; H04R 1/06
USPC ................................................ 381/94.1, 333
See application file for complete search history.

(56) References Cited

FOREIGN PATENT DOCUMENTS

| | | | | |
|---|---|---|---|---|
| KR | 2011126317 A | * 11/2011 | | H04R 1/02 |
| KR | 20110126317 | 11/2011 | | |
| KR | 20120011769 | 2/2012 | | |
| KR | 20120094336 | 8/2012 | | |
| KR | 101297658 | 8/2013 | | |
| KR | 101765679 | 8/2017 | | |

* cited by examiner

*Primary Examiner* — Ammar T Hamid
(74) *Attorney, Agent, or Firm* — The Belles Group, P.C.

(57) ABSTRACT

The present invention relates to a flat-type slim speaker, specifically, to a rectangular flat-type slim speaker having an integrated yoke enabling a slim magnetic core. The present invention comprises: a voice coil plate which comprises a voice coil vertically erected; magnets separated with the voice coil plate therebetween; a diaphragm coming into contact with an upper end surface of the voice coil plate and having an edge part which adheres to a seating part of the upper end of a yoke; a damper which is connected to a damper attachment part of the lower end surface of the voice coil plate and adheres to the lower end of the yoke; and the yoke having a slit into which the voice coil plate can be inserted in a longitudinal direction at the center thereof, and a space into which the magnets can be inserted from side to side.

11 Claims, 5 Drawing Sheets

[Fig. 1a]
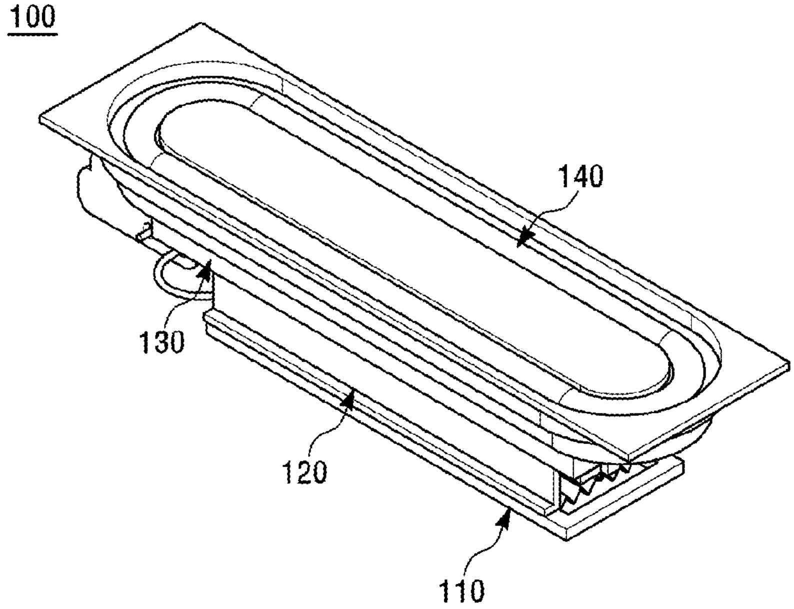
[Fig. 1b]
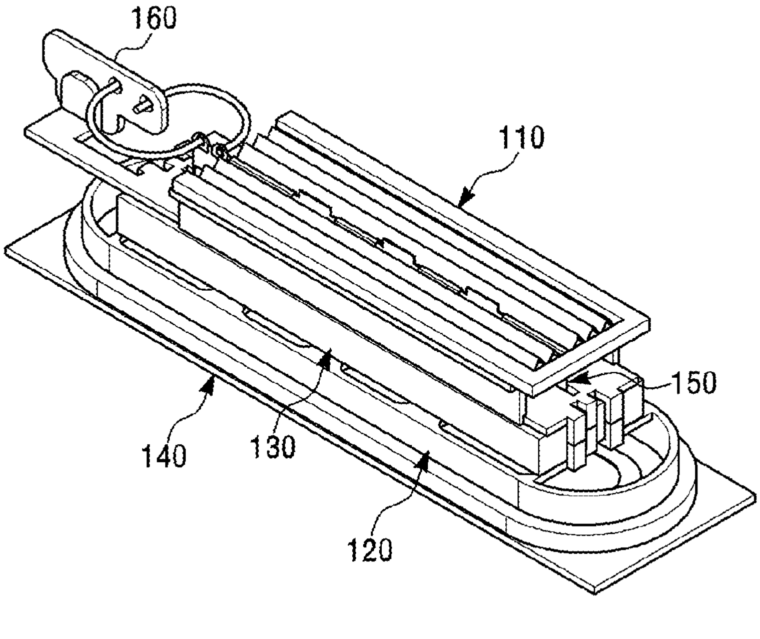

[Fig. 2]
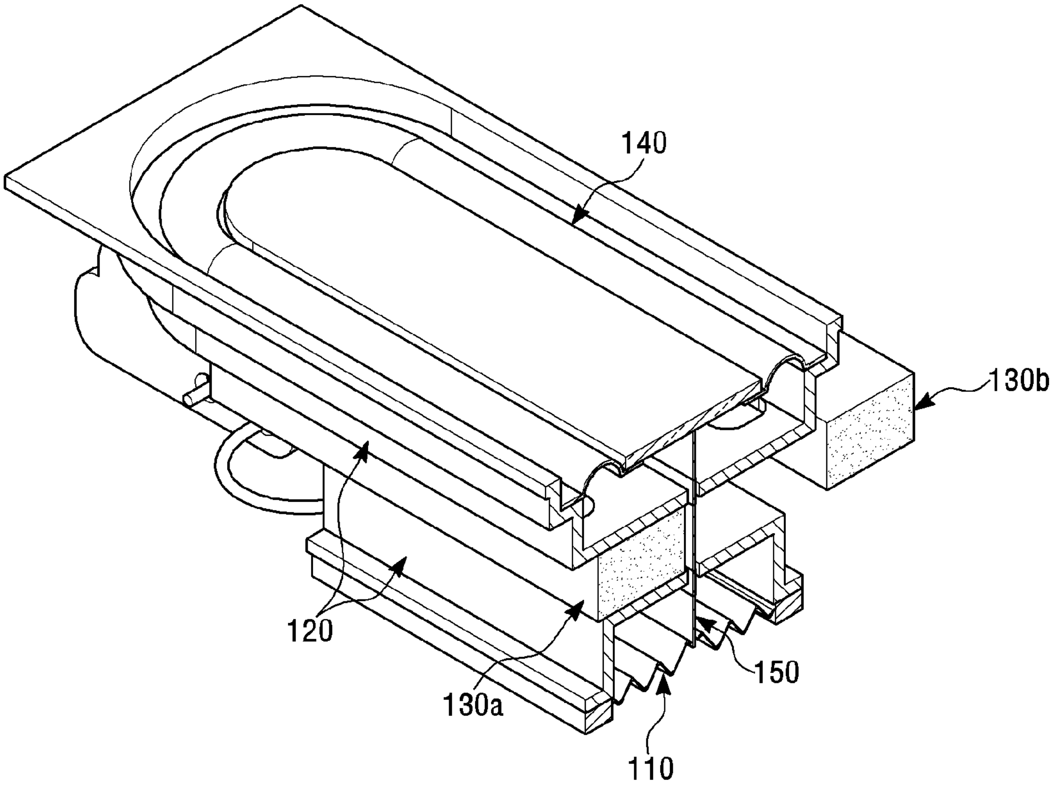

[Fig. 3]
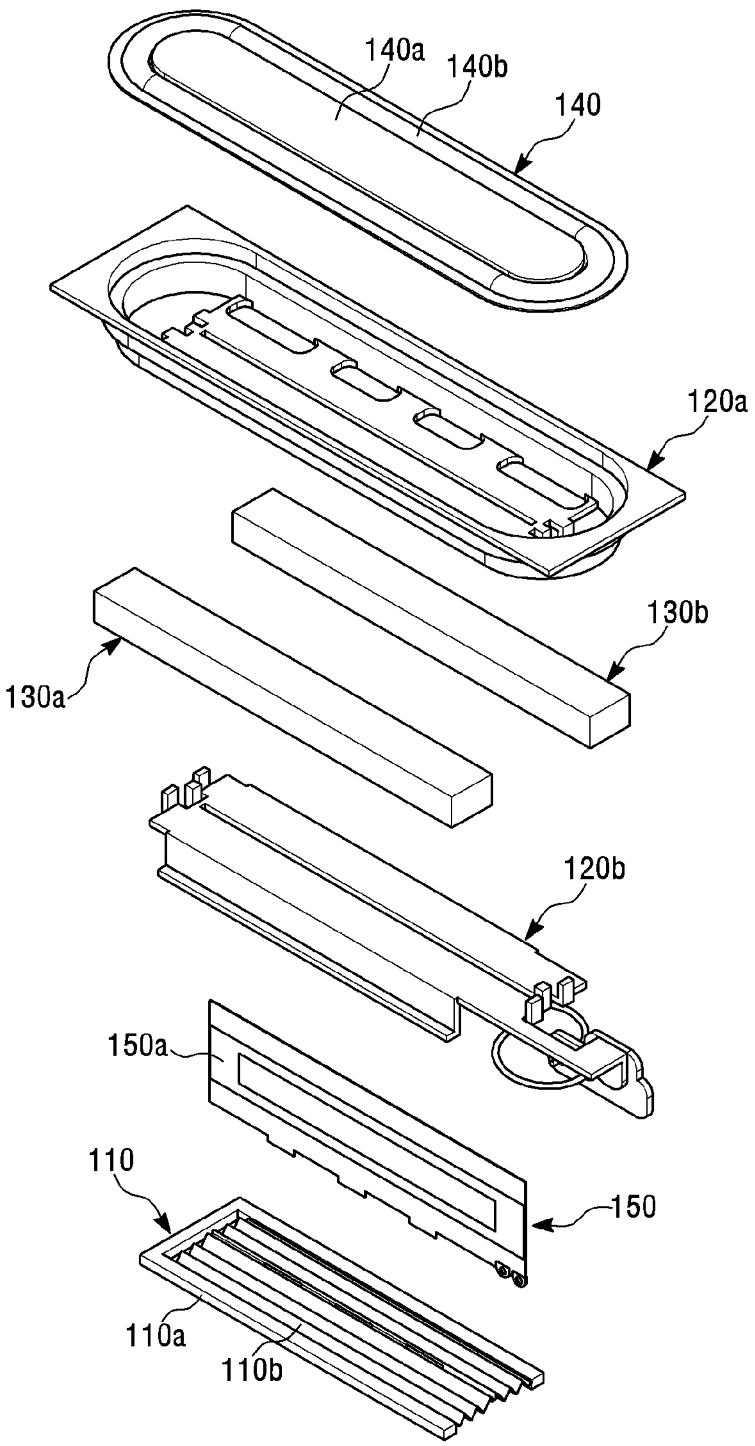

[Fig. 4]
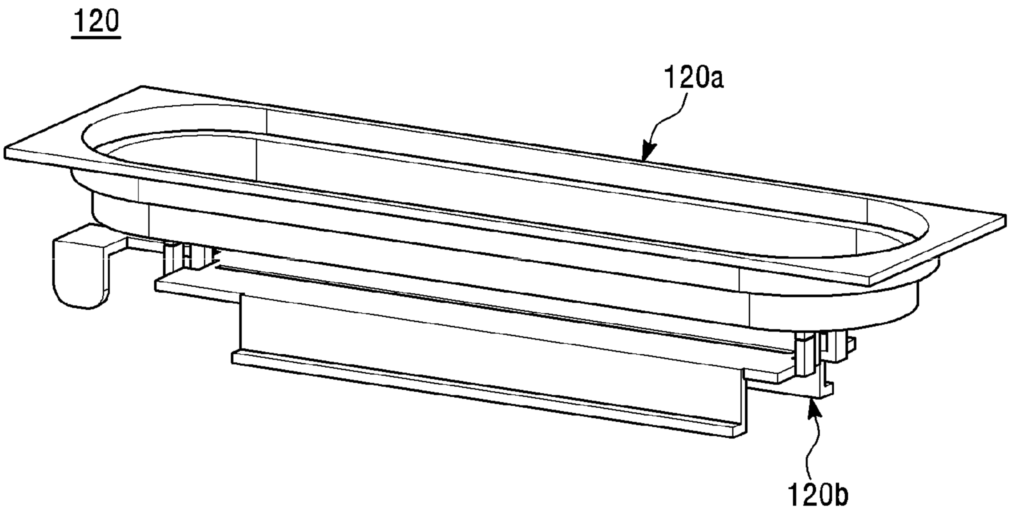
[Fig. 5a]
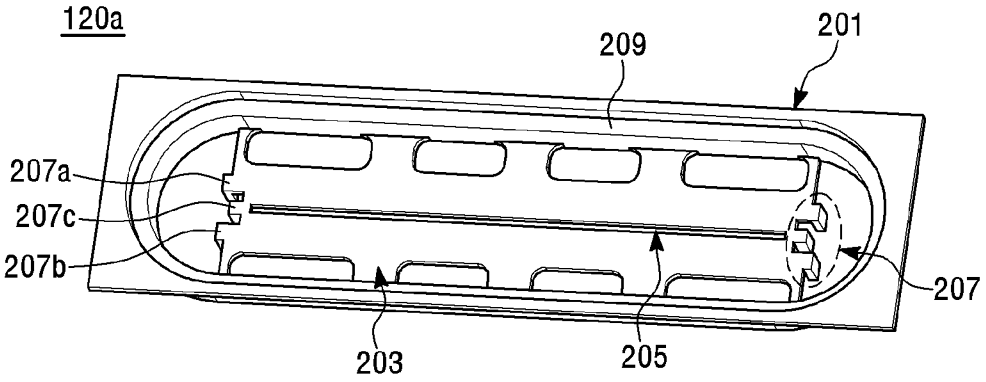
[Fig. 5b]
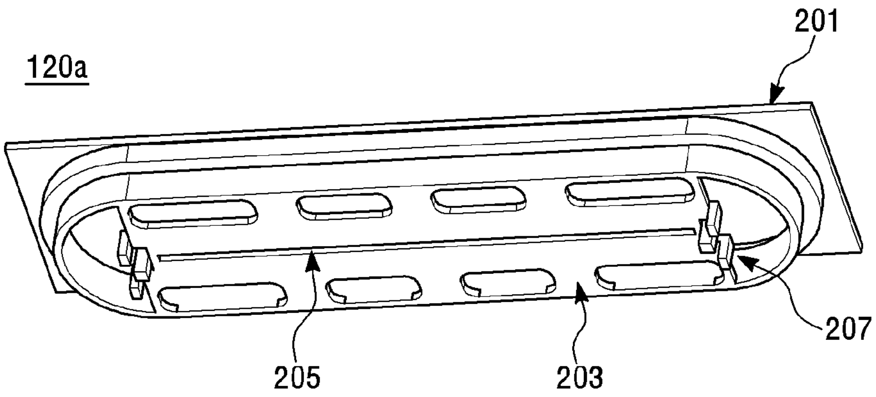

[Fig. 6]
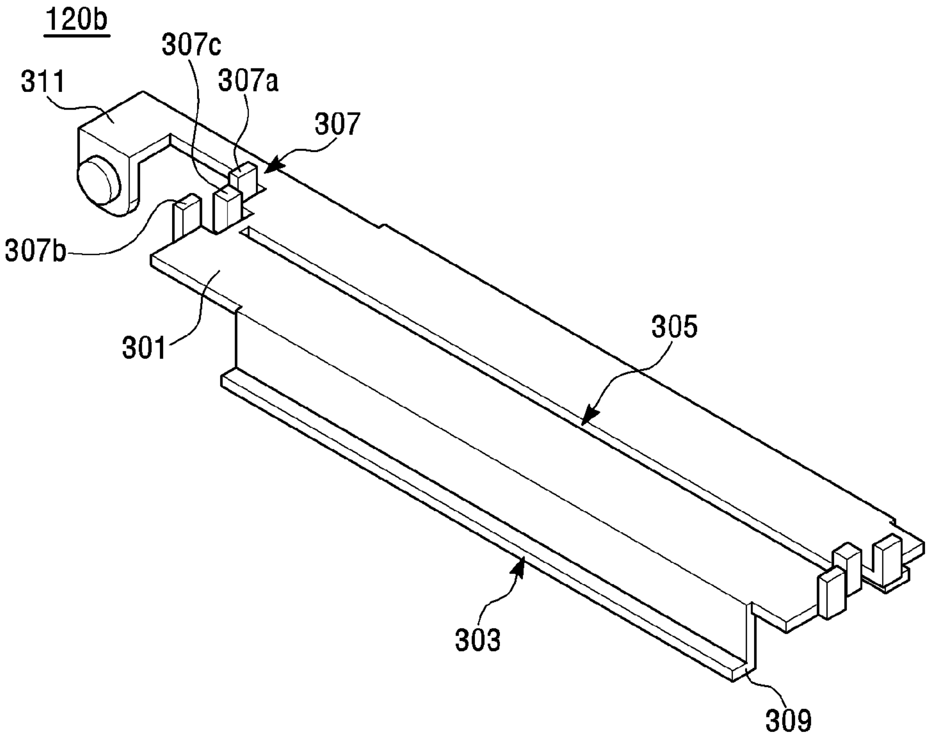
[Fig. 7]
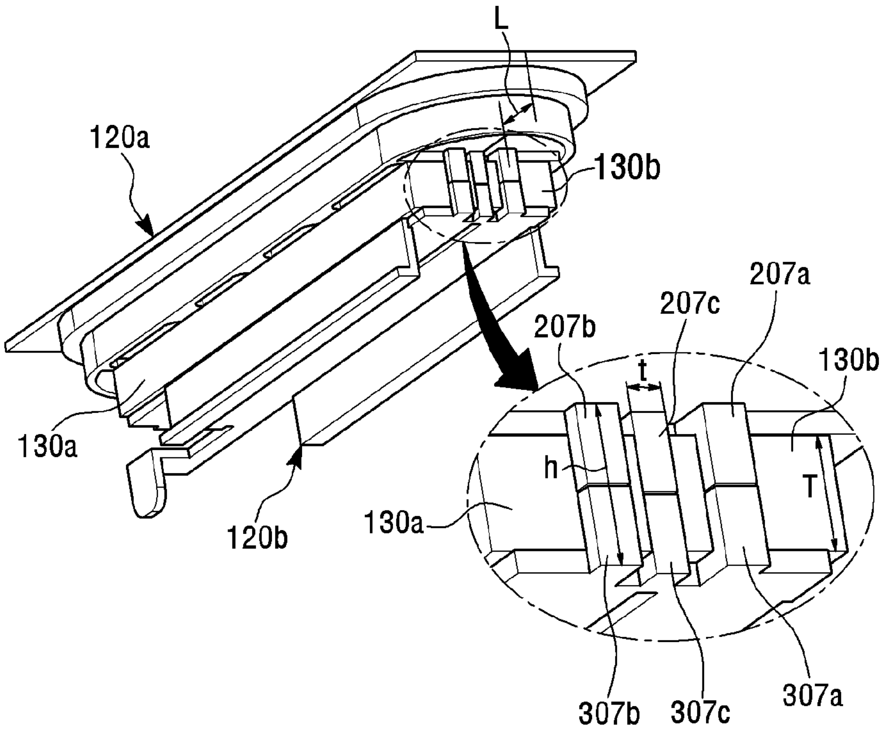

RECTANGULAR FLAT-TYPE SLIM SPEAKER HAVING SLIM MAGNETIC CORE

CROSS-REFERENCE TO RELATED PATENT APPLICATIONS

The present application is a U.S. national stage application under 35 U.S.C. § 371 of PCT Application No. PCT/KR2019/009915, filed Aug. 7, 2019, which claims priority to Korean Patent Application No. 10-2018-0091820, filed Aug. 7, 2018. The disclosures of the aforementioned priority applications are incorporated herein by reference in their entireties.

TECHNICAL FIELD

The present invention relates to a flat-type slim speaker and, more specifically, to a rectangular flat-type slim speaker having an integrated yoke enabling a slim magnetic core.

BACKGROUND ART

A voice coil plate used in a flat-type speaker is formed by being spiral-wound or print-patterned in an oval shape on a single surface or both surfaces of a coil base having a plate shape.

When current flows through a movable coil, the voice coil plate generate magnetic fields by which the flowing current expands and contracts around the movable coil. Since the movable coil is affected by the magnetic fields generated by a magnet within a speaker unit, the voice coil may vertically move while interacting with magnetic fields generated in the movable coil to correspond to the magnetic fields generated by the magnet. Also, since the voice coil plate is connected to a diaphragm of the speaker unit, the diaphragm may vertically move to push air out, thereby generating sound due to vibration of the air.

The flat-type speaker is being developed to have a thinner and longer structure with an increase in output capacity.

The flat-type speaker is characterized by having a rectangular shape and a flat and slim structure.

The structure of the flat-type speaker according to the related art is constituted by a base frame forming a frame (an outer appearance), a magnet, a yoke serving to condense magnetic lines, and a voice coil plate to constitute a magnetic circuit that generates magnetic fields and electric fields.

As an example of the flat-type speaker according to the related art, a flat-type speaker is disclosed in Korean Patent Registration No. 0-1119495.

The disclosed flat-type speaker is constituted by a base frame, a diaphragm, a magnet, a magnet plate, and a voice coil plate.

In general, the magnetic plate is disposed at a top, bottom, or side surface of the magnet to condense magnetic lines, and the magnet and the magnet plate are seated on the base frame made of a plastic material. A slot into which the voice coil plate is inserted to vibrate vertically is formed in a center of the base frame.

However, in recent years, since the trend of miniaturization of electronic devices is strong, miniaturization of the speaker inserted as a component may also be essential.

Thus, in order to realize the miniaturization of the speaker, there is a need to actively research a technology that is capable of miniaturizing and integrating each of the components constituting the speaker.

DISCLOSURE OF THE INVENTION

Technical Problem

The present invention has been devised to solve the above-described problems, and an object of the present invention is to improve and simplify a structure of a flat-type slim speaker.

In addition, the structure of the speaker may be simplified to reduce the number of components, thereby improving an assembly process based on the reduced number of components.

In addition, a magnet may be reduced in length to reduce an overall length of the speaker.

In addition, an integral yoke that is capable of multiply and simultaneously performing functions as a base frame, a magnet insertion guide, and a yoke may be provided.

Technical Solution

A rectangular flat-type slim speaker having a slim magnetic core according to the present invention for achieving the above objects includes: a voice coil plate which includes a voice coil and is vertically erected; magnets spaced apart from each other with the voice coil plate therebetween; a diaphragm that is in contact with an upper end surface of the voice coil plate and has an edge portion adhering to an upper end of a yoke; a damper which is connected to a lower end surface of the voice coil plate and adheres to a lower end of the yoke; and the yoke including a slit, into which the voice coil plate is inserted, in a center thereof in a longitudinal direction, a seating part to which an edge of the diaphragm adheres, a damper attachment part to which the damper adheres, and a space into which the magnets are inserted through left and right sides.

Here, the yoke may be divided into an upper yoke and a lower yoke, and the upper yoke and the lower yoke may be coupled to each other to form the space into which the magnets are inserted.

Here, the yoke may be divided into the upper yoke and the lower yoke, which are physically separated from each other or integrated with each other.

Here, the yoke may be divided into an upper yoke and a lower yoke, the silt may be formed in each of the upper yoke and the lower yoke, and the slit may be formed in a center of a horizontal plate of each of the upper yoke and the lower yoke.

Here, a plurality of coupling blocks may be formed at positions that are spaced a predetermined distance from left and right ends of the slit, and the plurality of coupling blocks may form the space into which the magnets are inserted.

Here, the plurality of coupling blocks may be constituted by a left block, a right block, and a center block.

Here, the left block and the right block may be disposed in the same line, and the center block may be disposed between the left block and the right block at a position, which is recessed inward with respect to the left block and the right block.

Here, the yoke may be divided into an upper yoke and a lower yoke, the slit may be formed in each of the upper yoke and the lower yoke, coupling blocks in a vertical downward direction and a vertical upward direction may be formed at positions that are spaced a predetermined distance from left and right ends of the slit, and the coupling blocks may be in contact with each other to form a space into which the magnets are inserted.

Here, the coupling blocks may be constituted by a left block and a right block, which are disposed in the same line, and a center block disposed between the left block and the right block at a position, which is recessed inward with respect to the left block and the right block.

Here, a terminal may integrally extend from one end of the yoke.

Here, the slit may be formed in a central line of a horizontal plate formed on an inner horizontal surface.

Advantageous Effects

According to the above-described constituents of the present invention, the embodiments of the disclosed technology may have the effect including the following advantages. However, since it does not mean that the embodiments of the disclosed technology should all including the advantages, the scope of the rights of the disclosed technology should not be understood as being limited thereby.

According to the present invention, the integral yoke that is capable of multiply and simultaneously performing the functions as the base frame, the magnet insertion guide, and the yoke may be provided to improve and simplify the structure of the flat-type slim speaker.

In addition, the structure of the speaker may be simplified to reduce the number of components, thereby improving the assembly process based on the reduced number of components.

In addition, the magnet may be reduced in length to reduce the overall length of the speaker.

In addition, the function of adjusting and maintaining the air gap between the magnet and the magnet and between the magnet and the yoke and the function serving as the support may be realized by the integral yoke, the formation of the air gap may be very simplified, and the magnets may be prevented from adhering to each other between the very fine air gaps.

BRIEF DESCRIPTION OF THE DRAWINGS

FIGS. 1*a*-1*b* are perspective views of a rectangular flat-type slim speaker including a slim magnetic core according to the present invention.

FIG. 2 is a cross-sectional view of the rectangular flat-type slim speaker including the slim magnetic core according to the present invention.

FIG. 3 is an exploded perspective view of the rectangular flat-type slim speaker including the slim magnetic core according to the present invention.

FIG. 4 is a perspective view of an integral yoke constituting a slim magnetic core of the rectangular flat-type slim speaker including the slim magnetic core according to the present invention.

FIGS. 5*a*-5*b* are perspective views illustrating an upper yoke of the integral yoke of the rectangular flat-type slim speaker including the slim magnetic core according to the present invention.

FIG. 6 is a perspective view illustrating a lower yoke of the integral yoke of the rectangular flat-type slim speaker including the slim magnetic core according to the present invention.

FIG. 7 is a structural diagram illustrating coupling between the integral yoke and a magnet of the rectangular flat-type slim speaker including the slim magnetic core according to the present invention.

MODE FOR CARRYING OUT THE INVENTION

Hereinafter, a structure and effects of a rectangular flat-type slim speaker including a slim magnetic core according to the present invention will be described with reference to the accompanying drawings.

Detailed descriptions according to specific embodiments that are illustrated in the accompanying drawings will be read in connection with the accompanying drawings, and the drawings are considered as a portion of the description of the entire invention. References to directions or directivity are for convenience of description only and are not intended to limit the scope of the present invention in any way.

Specifically, terms indicating positions such as "down, up, horizontal, vertical, upper, lower, upward, downward, upper side, a lower side", or derivatives thereof (for example, "horizontal, downward, upward" etc.) should be understood with reference to all the drawings and related descriptions being described. In particular, since these relative words are only for convenience of description, it does not require that the apparatus according to the present invention has be configured or operated in a specific direction.

In addition, terms that refer to the mutual coupling relationship between components, such as "mounted, attached, connected, continued, interconnected", unless otherwise stated, refer to the state in which individual components are directly or indirectly attached, connected, or fixed, and this should be understood as a term that encompasses not only a movably attached, connected, or fixed state, but also an immovable state.

Exemplary embodiments of the present invention will be described below in more detail with reference to the accompanying drawings. It is noted that the same or similar components in the drawings are designated by the same reference numerals as far as possible even if they are shown in different drawings. Moreover, detailed descriptions related to well-known functions or configurations will be ruled out in order not to unnecessarily obscure subject matters of the present invention.

FIGS. 1*a*-1*b* are perspective views of a rectangular flat-type slim speaker including a slim magnetic core according to the present invention, FIG. 2 is a cross-sectional view of the rectangular flat-type slim speaker including the slim magnetic core according to the present invention, and FIG. 3 is an exploded perspective view of the rectangular flat-type slim speaker including the slim magnetic core according to the present invention.

As illustrated in FIGS. 1*a* to 3, a rectangular flat-type slim speaker 100 including a slim magnetic core according to the present invention includes a damper 110, a yoke 120, a magnet 130, a diaphragm 140, and a voice coil plate 150.

The damper 110 may be made of a corrugated cloth, and the corrugated cloth 110*b* may adhere to and is fixed to an outer portion by an outer plate 110*a*. The damper 110 may assist vertical vibration of the voice coil plate 150 and have various types of structures.

The damper 110 may serve as a support for the speaker and also serve as a center guide so that the voice coil plate 150 is disposed at a center between magnetic circuit gaps. The damper may have elasticity that returns to its original shape when a vibration part vibrates.

The yoke 120 and the magnet 130 constitute a magnetic body constituting a magnetic circuit and form a pair of magnetic bodies facing each other with the voice coil plate 150 therebetween.

The magnets 130*a* and 130*b* provided in the facing magnetic bodies have opposite polarities so that attractive force acts therebetween, and the voice coil plate 150 may be spaced the same distance from each other so that the voice coil plate 150 receives the same magnetic force from both the magnetic bodies.

Each of the magnets 130*a* and 130*b* may be provided in a long rod shape.

The yoke 120 may be constituted by an upper yoke 120*a* and a lower yoke 120*b*. For another example, the upper yoke and the lower yoke may be provided to be integrated with each other. Although the upper yoke 120*a* and the lower yoke 120*b* are provided to be separated from each other in the exploded perspective view of FIG. 3, there is no problem at all in implementing the present invention through even one yoke 120 in which the upper yoke and the lower yoke are integrated with each other.

In general, the yoke 120 and the magnet 130 may be mounted on an outer frame that is referred to as a base frame to perform a function of the magnetic body. However, in the present invention, the base frame itself does not exist, and the yoke 120 serves as the base frame as it is.

The yoke 120 may be made of a conductive material and perform a function of the base frame forming a basic structure of the speaker, and also, the magnet 130 may be directly inserted through left and right surfaces of the yoke 120 to constitute the magnetic circuit.

The yoke 120 according to the present invention may basically act as a frame for the basic base frame of the speaker.

The yoke 120 may serve as a guide into which the magnet is directly inserted in a left and right direction without a separate base frame and may perform a main role of the yoke, i.e., condense the magnetic lines to increase in magnetic flux density.

The yoke 120 forms a magnetic air gap between the magnets, and the air gap may be very simply and easily formed through a slit structure. In addition, the air gap may be adjustable, and the adhesion between the magnets due to the narrow air gap may be suppressed.

Also, since the yoke 120 serves as the base frame of the speaker, the yoke 120 serves as a structure that supports the diaphragm 140 at an upper side and a structure that supports or couples the damper at a lower side.

The yoke 120 may implement the speaker having a structure that does not require the base frame to more simplify the speaker, thereby reducing the number of components and innovatively improving an assembly process.

Also, the yoke 120 according to the present invention may have a frame structure to reduce a length of the magnet, thereby innovatively reducing a width of the speaker in a longitudinal direction. In addition, the yoke 120 may have an amplitude adjustment function of automatically adjusting an amplitude when the speaker vertically vibrates.

The yoke 120 will be described in more detail with reference to FIGS. 4 to 7.

The diaphragm 140 is an object that is attached to a center of the voice coil plate 150 to vibrate according to the vertical vibration of the voice coil plate 150. When the diaphragm 140 vibrates, air vibrates to generate a sound.

The diaphragm 140 may be constituted by a plate-shaped vibration body 140*a* that directly vibrates and a track-shaped edge 140*b* that allows the vibration body 140*a* to vibrate.

The voice coil plate 150 is attached to a lower side of the vibration body 140*a*, and the edge 140*b* is attached and coupled to the yoke 130.

If current is sent to a voice coil formed on the voice coil plate 150 according to Fleming's left-hand rule, whenever a flowing direction of the current flowing through the voice coil is changed in an opposite direction, a direction of force is changed in an opposite direction so that the voice coil 150 moves vertically. As a result, the diaphragm 140 of the speaker, which is attached to the voice coil, is reciprocated to play a sound through the speaker. Here, when the diaphragm vibrates quickly (at a high frequency), a high sound may be played, and when the diaphragm vibrates slowly (at a low frequency), a low sound may be played. Also, when an amplitude of the diaphragm is large, a strong sound may be played, and when the amplitude is small, a weak sound may be played.

The voice coil plate 150 may include a PCB-shaped coil plate and a voice coil that is pattern-printed in a track shape.

Referring to FIG. 2, based on the yoke 120 constituting the frame, the diaphragm 140 is attached to an upper end of the yoke 120 through the edge 140*b*, the voice coil plate 150 that is erected vertically is disposed at a center of the yoke 120, and the damper 110 is attached to a lower end of the yoke 120.

A top surface of the voice coil plate 150 is attached to a center of the diaphragm 140, and a bottom surface of the voice coil plate 150 is attached to a center of the damper 110.

The magnet 130 is directly inserted into left and right surfaces of the yoke 120.

FIG. 4 is a perspective view of an integral yoke constituting the slim magnetic core of the rectangular flat-type slim speaker including the slim magnetic core according to the present invention, FIG. 5 is a perspective view illustrating an upper yoke of the integral yoke of the rectangular flat-type slim speaker including the slim magnetic core according to the present invention, and FIG. 6 is a perspective view illustrating a lower yoke of the integral yoke of the rectangular flat-type slim speaker including the slim magnetic core according to the present invention.

Referring to FIG. 4, the yoke 120 according to the present invention may be divided into an upper yoke 120*a* disposed at an upper side and a lower yoke 120*b* disposed at a lower side and may be made of a conductive metal material.

According to a preferred embodiment, the upper yoke 120*a* and the lower yoke 120*b* may have shapes that are physically separated from each other, but may have a structure constituting a single body that is not physically separated from each other.

Therefore, the structure illustrated in FIGS. 4 to 6, which is described in the shape, in which the upper yoke and the lower yoke are separated from each other, is for convenience of explanation. That is, it is natural that the speaker according to the present invention includes the structure in which the upper yoke and the lower yoke are physically separated from each other and the structure in which the upper yoke and the lower yoke are integrated with each other without being separated from each other.

The upper yoke 120*a* will be described with reference to FIGS. 5*a*-5*b*.

FIG. 5*a* is a perspective view when viewed downward from an upper side, and FIG. 5*b* is a perspective view when viewed upward from a lower side.

The upper yoke 120*a* may include a rim 201 defining an outer portion and horizontal plates 203 connected to an inner surface of the rim 201.

A seating part 209 having the form of a curved surface is further formed on an upper portion of the rim 201. The seating part 209 forms a surface to which the edge 140*b* of the diaphragm 140 is attached.

A rim having an oval shape is further formed in a downward direction based on the seating part 209.

The horizontal plates 203 extend horizontally from left and right inner surfaces of the rim 201, respectively.

A slit 205 may be formed in a center of each of the horizontal plates 203 in a longitudinal direction, and the voice coil plate 150 may be inserted to pass through the inside of the slit 205.

A coupling block 207 may be formed at one end and the other end of the horizontal plate 203 in a vertical downward direction.

The coupling block 207 may be constituted by three blocks. A left block 207*a* and a right block 207*b*, which are disposed at left and right sides, may be disposed in a horizontal line, and a center block 207*c* may be disposed between the left block 207*a* and the right block 207*b*.

The center block 207*c* may be formed at a position that further enters to the inside of the speaker than the left block 207*a* and the right block 207*b* and disposed in the same line as the slit 205.

The coupling block 207 may designate the position of the magnet 130 and the air gap, fix the magnet 130, and determine a thickness and length of the magnet.

The left block 207*a* and the right block 207*b* may hold both ends of the magnet, respectively. The center block 207*c* may prevent the magnet from further entering inward to maintain the air gap between the magnets.

Since the yoke 120 itself is made of the conductive metal material, the coupling block 207 may be provided.

The left block 207*a* and the center block 207*c*, and the right block 207*b* and the center block 207*c* serve to horizontally and vertically fix the magnet 130 that is inserted in the left and right directions.

The thickness of the magnet 130 may be determined according to the length of the coupling block 207 that extends in the vertical downward direction. In other words, the thickness of the magnet 130 may be adjusted according to the length of the coupling block 207 in the vertical downward direction.

Also, the length of the magnet 130 may be adjusted according to the position of the coupling block 207.

According to the related art, the base frame constitutes the outer frame. Thus, there is a problem in that the magnet increases in length by an unnecessary length because a constitute capable of fixing the magnet and yoke at the left and right ends is required. That is, since the magnet and the yoke have to be held at both ends of the base frame, a magnet having a length greater than that of the voice coil plate is required. Thus, there is a problem in that the length of the entire speaker increases.

On the other hand, according to the structure of the yoke 120 of the present invention, since the yoke 120 itself serves as the frame, the coupling block 207 may be defined at the position of the slit 205 into which the voice coil plate 150 is inserted. Thus, the magnet 130 may be limited to the length between the coupling blocks 207.

That is, the length of the magnet 130 may be reduced by the distance between the coupling blocks 207. As a result, the total length of the speaker may be reduced to realize the slim and miniaturized speaker.

Since the length of the magnet 130 is effective only at the portion at which the voice coil of the voice coil plate 150 is formed, portions of other magnets may be invalid and unnecessary, and thus, the invalid and unnecessary portions may be reduced to realize the slim flat-type speaker.

The lower yoke 120*b* will be described with reference to FIG. 6.

The lower yoke 120*b* has an approximately '⊏' shape in cross-section and includes a horizontal plate 301, which is disposed at each of left and right sides, and a vertical plate 303 extending vertically downward from each of both ends of the horizontal plate 301.

A slit 305 into which the voice coil plate 150 is inserted may be formed at a center of the horizontal plate 301 in a longitudinal direction, like the upper yoke 120*a*, and the coupling block 307 may be formed at each of both ends of the horizontal plate 301.

The coupling block 307 has a shape that extends upward vertically and is constituted by a left block 307*a*, a right block 307*b*, and a center block 308*c*, each of which is in contact with the coupling block 207 of the upper yoke 120*a*. The coupling block 307 has the same function and role as the coupling block 207 of the upper yoke 120*a*.

The left and right vertical plates 303 may determine the amplitude of the voice coil plate 150. As a result, the amplitude of the voice coil plate 150 may increase or decrease according to the increase or decrease in width of each of the vertical plates 303.

A front end of the vertical plate 303 may be bent in a right-angled outward direction. The bent portion of the vertical plate 303 may form a damper mounting part 209 to which the damper 110 is attached.

A terminal 311 for electrical connection may be integrated with one end of the horizontal plate 301.

The coupling block 307 may be constituted by three blocks. A left block 307*a* and a right block 307*b*, which are disposed at left and right sides, may be disposed in a horizontal line, and a center block 307*c* may be disposed between the left block 307*a* and the right block 307*b*.

The center block 307*c* may be formed at a position that further enters to the inside of the speaker than the left block 307*a* and the right block 3207*b* and disposed in the same line as the slit 305.

The coupling block 307 may designate the position of the magnet 130 and the air gap, fix the magnet 130, and determine a thickness and length of the magnet.

The left block 307*a*, the right block 307*b*, and the center block 307*c* of the lower yoke 120*b* may be disposed to correspond to the left block 207*a*, the right block 207*b*, and the center block 207*c* of the upper yoke 120*a*, respectively.

As described above, even if the upper yoke 120*a* and the lower yoke 120*b* are not physically separated from each other, but are integrated with each other, the structure of each of the coupling blocks may be maintained, and also, the upper and lower coupling blocks may not be separated from each other, but be maintained in the connected shape.

FIG. 7 is a structural diagram illustrating coupling between the integral yoke and the magnet of the rectangular flat-type slim speaker including the slim magnetic core according to the present invention.

FIG. 7 is a view illustrating a coupled state between each of the coupling blocks 207 and 307 and the magnet 130.

In each of the coupling blocks 207 and 307, each of the left blocks 207*a* and 307*a*, each of the right blocks 207*b* and 307*b*, and the center blocks 207*c* and 307*c* are maintained to be in contact with each other by being coupled to each other.

In this state, the magnets 130*a* and 130*b* are inserted through left and right sides, both end surfaces of the magnets 130*a* and 130*b* are fixed by inner surfaces of each of the left blocks 207*a* and 307*a* and each of the right blocks 207*b* and 307*b*, and insertion positions of inner surfaces of the magnets 130*a* and 130*b* are determined by the left and right surfaces of each of the center blocks 207*c* and 207*c*.

The magnets 130_a_ and 130_b_ have opposite polarities and attracted with respect to each other to prevent the magnets 130_a_ and 130_b_ from be attached to each other by magnetic properties.

Although magnetic force is very strong, since each of the coupling block 207 and 307 itself is made of a conductive metal to overcome the magnetic force. However, it is impossible to realize this structure by using the base frame made of the existing synthetic resin.

An air gap may be formed between the magnets according to a thickness t of each of the center blocks 207_c_ and 307_c_, and also, the air gap may be adjusted by adjusting the thickness t.

A thickness T of the magnet 120 may be determined according to a depth h of each of the coupling block 207 and 307, and also, the thickness T of the magnet 120 may be adjusted by adjusting the thickness T.

Since each of the center blocks 207_c_ and 307 is formed adjacent to each of the slits 205 and 305 in the same line as each of the slits 205 and 305, the magnet may be reduced in length.

In the base frame structure according to the related art, a groove may be formed in each of both ends to fix the magnet 120 and maintain the air gap. Thus, substantially, a length L that is equal to + alpha in each of the left and right directions from the position, at which each of the coupling blocks 207 and 307 is formed, is further required. However, since the length L is an invalid length that is not related to the voice coil of the voice coil plate 150, the length L may act as a cause in which the speaker increases in length without the need. Due to the structure of the yoke according to the present invention, the actual length of the magnet may be reduced, and thus, the length of the speaker may be reduced to realize the miniaturization of the speaker.

As described above, it is possible to implement the slim magnetic body by the structure of the yoke according to the present invention, and the width and length of the magnet may be adjusted to realize the miniaturization of the speaker. Therefore, the number of components may be reduced to simplify the assembly process.

Features, structures, and effects described in the above embodiments are incorporated into at least one embodiment, but are not limited to only one embodiment. Moreover, features, structures, and effects exemplified in one embodiment can easily be combined and modified for another embodiment by those skilled in the art. Therefore, these combinations and modifications should be construed as falling within the scope of the present invention.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A rectangular flat-type slim speaker having a slim magnetic core, comprising:

a voice coil plate which comprises a voice coil and is vertically erected;

magnets spaced apart from each other with the voice coil plate therebetween;

a diaphragm that is in contact with an upper end surface of the voice coil plate and has an edge portion adhering to an upper end of a yoke;

a damper which is connected to a lower end surface of the voice coil plate and adheres to a lower end of the yoke; and the yoke comprising a slit, into which the voice coil plate is inserted, in a center thereof in a longitudinal direction, a seating part to which an edge of the diaphragm adheres, a damper attachment part to which the damper adheres, and a space into which the magnets are inserted through left and right sides.

2. The rectangular flat-type slim speaker of claim 1, wherein the yoke is divided into an upper yoke and a lower yoke, and the upper yoke and the lower yoke are coupled to each other to form the space into which the magnets are inserted.

3. The rectangular flat-type slim speaker of claim 2, wherein the yoke is divided into the upper yoke and the lower yoke, which are physically separated from each other or integrated with each other.

4. The rectangular flat-type slim speaker of claim 1, wherein the yoke is divided into an upper yoke and a lower yoke, the silt is formed in each of the upper yoke and the lower yoke, and the slit is formed in a center of a horizontal plate of each of the upper yoke and the lower yoke.

5. The rectangular flat-type slim speaker of claim 1, wherein a plurality of coupling blocks are formed at positions that are spaced a predetermined distance from left and right ends of the slit, and the plurality of coupling blocks form the space into which the magnets are inserted.

6. The rectangular flat-type slim speaker of claim 5, wherein the plurality of coupling blocks is constituted by a left block, a right block, and a center block.

7. The rectangular flat-type slim speaker of claim 6, wherein the left block and the right block are disposed in the same line, and the center block is disposed between the left block and the right block at a position, which is recessed inward with respect to the left block and the right block.

8. The rectangular flat-type slim speaker of claim 1, wherein the yoke is divided into an upper yoke and a lower yoke, the slit is formed in each of the upper yoke and the lower yoke, coupling blocks in a vertical downward direction and a vertical upward direction are formed at positions that are spaced a predetermined distance from left and right ends of the slit, and the coupling blocks are in contact with each other to form a space into which the magnets are inserted.

9. The rectangular flat-type slim speaker of claim 8, wherein the coupling blocks are constituted by a left block and a right block, which are disposed in the same line, and a center block disposed between the left block and the right block at a position, which is recessed inward with respect to the left block and the right block.

10. The rectangular flat-type slim speaker of claim 1, wherein a terminal integrally extends from one end of the yoke.

11. The rectangular flat-type slim speaker of claim 1, wherein the slit is formed in a central line of a horizontal plate formed on an inner horizontal surface.

* * * * *